Figure 1:
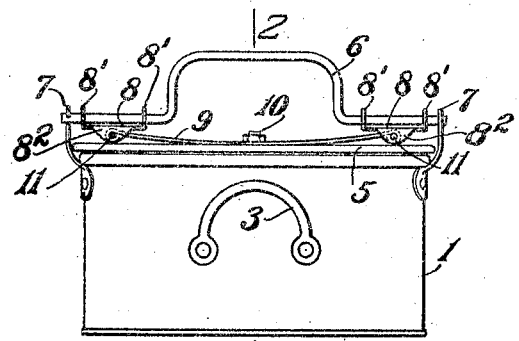

J. R. DONNELLY.
COOKING VESSEL.
APPLICATION FILED JUNE 24, 1910.

1,006,469.

Patented Oct. 24, 1911.

WITNESSES
R. B. Ellms.
L. D. Goodwin.

INVENTOR
JOHN R. DONNELLY
BY Chas Spear
ATTY.

UNITED STATES PATENT OFFICE.

JOHN R. DONNELLY, OF FORT WAYNE, INDIANA.

COOKING VESSEL.

1,006,469.  Specification of Letters Patent.  Patented Oct. 24, 1911.

Application filed June 24, 1910. Serial No. 568,650.

*To all whom it may concern:*

Be it known that I, JOHN R. DONNELLY, a citizen of the United States, residing at Fort Wayne, Indiana, have invented certain new and useful Improvements in Cooking Vessels, of which the following is a specification.

This invention relates to cooking utensils and particularly to a baking vessel for such articles of food as require a gradual cooking such as in the baking of beans. One of the difficulties experienced in this sort of cooking has been the generation of steam within the vessel. It is desirable to accomplish the cooking in the presence of a certain amount of moisture and it is therefore necessary, in order to secure the proper flavor that the cooking be carried on under cover so as to prevent any continuous escapement of the volatile products generated by the heating. To the end therefore of providing a vessel capable of containing articles of food of this nature through cooking in such a way as to retain a sufficient amount of moisture and to conserve the volatilized material upon which flavor so much depends, I have devised my present invention. I accomplish this in brief by providing a relieving cover which may be raised by steam pressure but which will normally maintain the proper amount of moisture or other volatilized products necessary to the desired result.

The construction and operation of my device will be more fully described in the specification which follows, and in the drawings which form a part of this specification I have shown, as an illustrative embodiment, a construction which I find well adapted to practical use.

Figure 2:
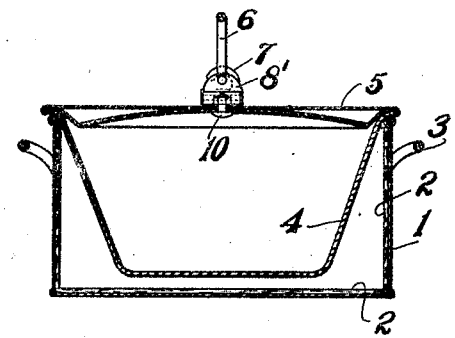
Figure 3:
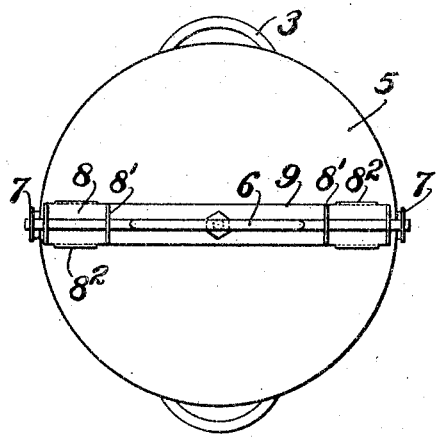
Figure 4:
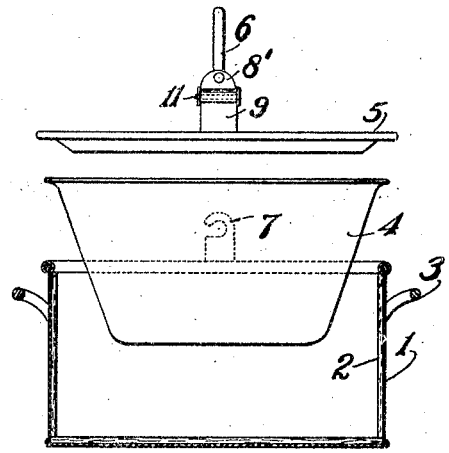
Figure 5:
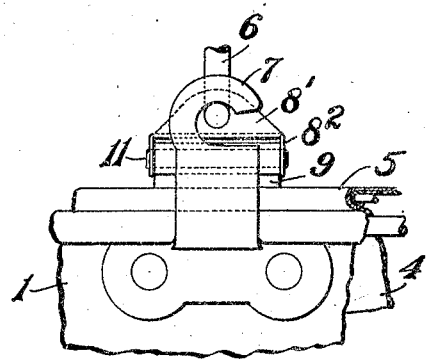

Throughout specification and drawings like reference numerals are employed to indicate corresponding parts and in the drawings:

Figure 1 is a side view of a vessel constructed in accordance with my invention, Fig. 2 a sectional view on the line 2—2 Fig. 1, Fig. 3 a plan view of the vessel, and, Fig. 4 is a partly sectioned view along the same line as Fig. 2 but with the cover and inner vessel in elevation and separated, and Fig. 5 is a detail of the yielding locking bail of the cover.

An outside vessel 1 of any suitable construction is preferably fitted with an asbestos or other non-conducting lining 2 and having suitable handles 3. An inner vessel 4 having an outer flange is adapted to rest on the upper edge of the vessel 1.

5 is a cover preferably formed double with an insulating space between.

6 is a bail having its ends pivoted in bearings $8^1$ which are turned up on the ends of a plate 8. The plate 8 has down-turned bearings $8^2$ in which are pinned, as at 11, the bent ends of a leaf spring 9 which is bolted at 10 to the center of the cover. The bolt 10 passes loosely through the leaf spring 9 so that the spring, together with the handle, is pivoted or swiveled to the cover 5. This permits the twisting of the handle on the cover. The ends of the bail 6 project beyond the edges of the vessel and are adapted to engage the hooks 7 which are riveted to the outer vessel 1.

In use my vessel is employed as follows: The inner receptacle 4 is filled with beans or other food to be cooked with a proper amount of water and set within the outer vessel 2. The cover 5 is then applied and the ends of the bail 6 engaged by pressing down on the handle against the action of the spring 9 until the ends are low enough to pass under the hooks 7. The pressure on the handle is then relieved to allow the handle ends to engage the upper bend of the hooks 7. When placed in the oven the handle may be turned down flat or left standing, according to the amount of room available. As the cooking proceeds, the food within the inner vessel 1 is subjected to a slow heat, gradually applied and evenly maintained on account of the insulation of the outer vessel 1 and the air space between it and the inner vessel 4 and the insulation of the cover 5. If the steam pressure rises within the inner vessel 4 above the pressure of the spring 9, the cover 5 will be quickly lifted to permit the excess steam to escape. I am therefore able to cook articles of food under a slow temperature in a closed vessel and at a predetermined pressure.

Various modifications in the form and structure of my invention may obviously be made without departing from the spirit of my invention if within the limits of the appended claims.

What I, therefore, claim and desire to secure by Letters Patent is:—

1. A cooking vessel of the class described, comprising a containing member and a cover therefor, a bail transversely disposed on said cover and having its ends projecting beyond said cover, a resilient member operatively mounted between said bail and said cover, means on said vessel for engaging the opposite ends of said bail, said means comprising a hook member adapted to receive the end of said bail under the action of said resilient member.

2. A cooking vessel of the class described comprising an outer vessel and an inner vessel adapted to be supported therein with an intervening air space, hooked ears upon the outer vessel, a cover, a leaf spring pivoted to said cover, a bail pivotedly mounted upon said leaf spring and having its ends projecting beyond the cover and adapted to engage said hook ears.

In testimony whereof, I affix my signature in presence of two witnesses.

JOHN R. DONNELLY.

Witnesses:
C. A. FERRIS,
ELLA M. BURNELL.